United States Patent
Jarande et al.

(10) Patent No.: US 12,410,856 B2
(45) Date of Patent: Sep. 9, 2025

(54) COLLAR TYPE DIFFERENTIAL WHICH COMBINES LIMITED SLIP AND LOCKING CAPABILITY

(71) Applicant: EATON INTELLIGENT POWER LIMITED, Dublin (IE)

(72) Inventors: Swapnil Jarande, Pune (IN); Rupesh Surve, Pune (IN)

(73) Assignee: EATON INTELLIGENT POWER LIMITED, Dublin (IE)

(*) Notice: Subject to any disclaimer, the term of this patent is extended or adjusted under 35 U.S.C. 154(b) by 0 days.

(21) Appl. No.: 18/251,353

(22) PCT Filed: Nov. 4, 2021

(86) PCT No.: PCT/EP2021/025431
§ 371 (c)(1),
(2) Date: May 1, 2023

(87) PCT Pub. No.: WO2022/096152
PCT Pub. Date: May 12, 2022

(65) Prior Publication Data
US 2023/0417311 A1    Dec. 28, 2023

(30) Foreign Application Priority Data
Nov. 4, 2020    (IN) .............................. 202011048082

(51) Int. Cl.
*F16H 48/22* (2006.01)
*F16H 48/08* (2006.01)
(Continued)

(52) U.S. Cl.
CPC ............. *F16H 48/34* (2013.01); *F16H 48/08* (2013.01); *F16H 48/22* (2013.01); *F16H 48/40* (2013.01); *F16H 2048/282* (2013.01)

(58) Field of Classification Search
CPC .......... F16H 48/34; F16H 48/08; F16H 48/22; F16H 48/40; F16H 2048/346; F16H 2048/282
(Continued)

(56) References Cited

U.S. PATENT DOCUMENTS 4,838,118 A    6/1989   Binkley
5,007,886 A    4/1991   Holmquist et al.
(Continued)

FOREIGN PATENT DOCUMENTS

| EP | 1435479 A2 | 7/2004 |
| JP | 2008281194 A | 11/2008 |
| WO | 2016/007724 A2 | 1/2016 |

*Primary Examiner* — Roger L Pang
(74) *Attorney, Agent, or Firm* — Merchant & Gould P.C.

(57) ABSTRACT

A differential assembly includes a first case half. A second case half is connected to the first case half. The first and second case halves define a gear chamber. The first and second case halves each include pockets formed therein. A differential gear set is disposed in the gear chamber. First and second clutch packs are disposed in the pockets between the first and second case halves and differential gear set. The clutch packs engage the first and second case halves and the differential gear set defining a limited slip. A locking collar is disposed in a cavity formed in one of the first or second case halves. An electric actuator mechanism is coupled to the locking collar selectively moving the locking collar into engagement with the differential gear set locking the differential.

14 Claims, 2 Drawing Sheets

(51) Int. Cl.
*F16H 48/34* (2012.01)
*F16H 48/40* (2012.01)
*F16H 48/28* (2012.01)

(58) Field of Classification Search
USPC .................. 475/231, 234, 235, 240, 241
See application file for complete search history.

(56) References Cited

U.S. PATENT DOCUMENTS

| | | | |
|---|---|---|---|
| 5,445,574 A * | 8/1995 | Sekiguchi | F16F 15/1442 |
| | | | 475/346 |
| 6,537,172 B1 | 3/2003 | McAuliffe, Jr. et al. | |
| 6,591,855 B2 | 7/2003 | Nishi et al. | |
| 7,264,568 B2 | 9/2007 | Ludwig et al. | |
| 7,354,374 B2 | 4/2008 | Teraoka | |
| 8,695,456 B2 * | 4/2014 | Fox | F16H 48/22 |
| | | | 475/249 |
| 2003/0121750 A1 * | 7/2003 | Teraoka | F16H 48/22 |
| | | | 192/93 A |
| 2007/0179008 A1 * | 8/2007 | Fusegi | F16D 13/52 |
| | | | 475/231 |
| 2008/0254931 A1 | 10/2008 | Sugaya et al. | |
| 2020/0141476 A1 | 5/2020 | Zink et al. | |

* cited by examiner

COLLAR TYPE DIFFERENTIAL WHICH COMBINES LIMITED SLIP AND LOCKING CAPABILITY

FIELD OF THE INVENTION

The invention relates to differentials and more particularly to limited slip locking differentials.

BACKGROUND OF THE INVENTION

A conventional limited slip differential (LSD) cannot give full locking capability. Further, prior art locking differentials are usually noisy and the tires may wear out quickly. There is therefore a need in the art for better handling and off-road capability associated with a LSD and allow complete locking when desired.

SUMMARY OF THE INVENTION

In one aspect, there is disclosed a differential assembly includes a first case half A second case half is connected to the first case half. The first and second case halves define a gear chamber. The first and second case halves each include pockets formed therein. A differential gear set is disposed in the gear chamber. First and second clutch packs are disposed in the pockets between the first and second case halves and differential gear set. The clutch packs engage the first and second case halves and the differential gear set defining a limited slip. A locking collar is disposed in a cavity formed in one of the first or second case halves. An electric actuator mechanism is coupled to the locking collar selectively moving the locking collar into engagement with the differential gear set locking the differential.

In another aspect, a differential assembly includes a first case half A second case half is connected to the first case half. The first and second case halves define a gear chamber. The first and second case halves each include pockets formed therein. A differential gear set is disposed in the gear chamber. First and second clutch packs are disposed in the pockets between the first and second case halves and differential gear set. The clutch packs engage the first and second case halves and the differential gear set defining a limited slip. A locking collar is disposed in a cavity formed in one of the first or second case halves. An electric actuator mechanism is coupled to the locking collar selectively moving the locking collar into engagement with the differential gear set locking the differential. One of the first or second case halves includes a laterally extending wall formed thereon. The laterally extending wall separates the clutch pack from the locking collar.

DETAILED DESCRIPTION OF THE PREFERRED EMBODIMENTS

Figure 1:
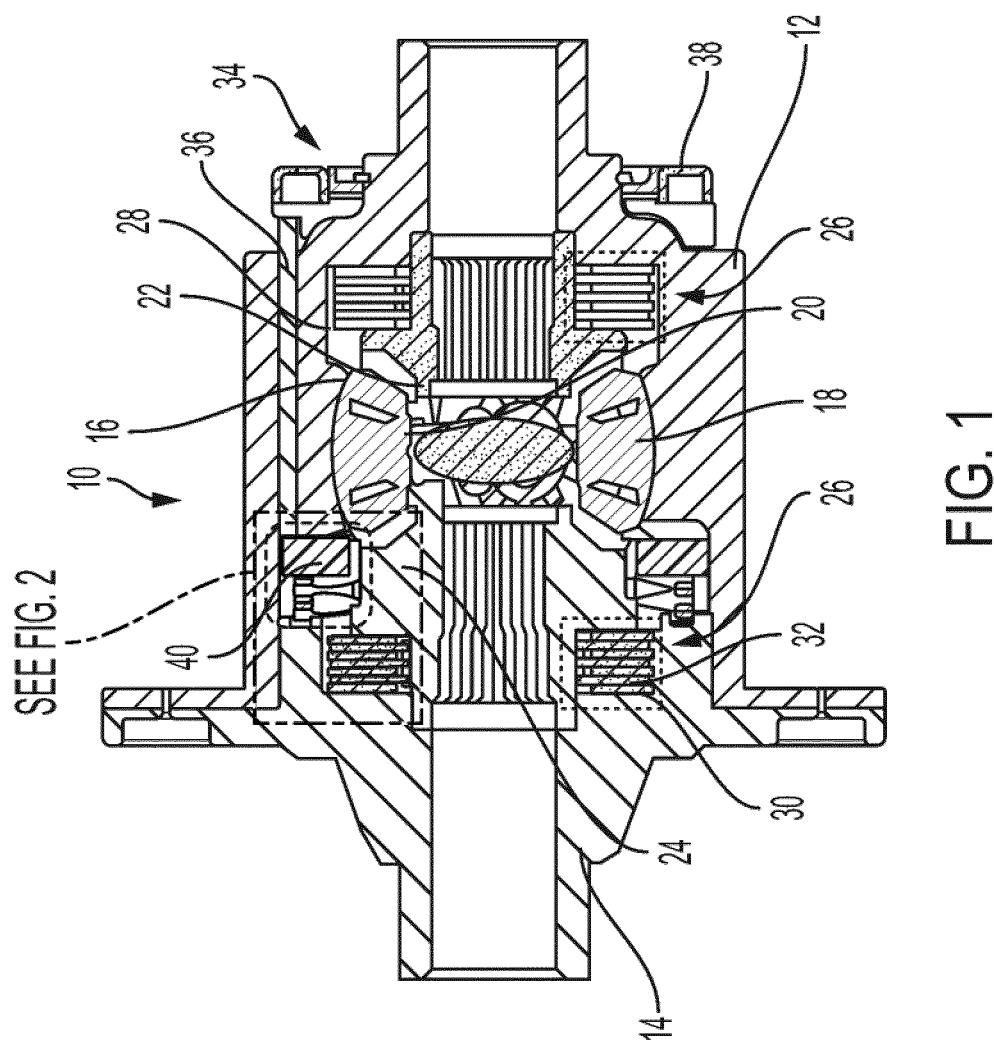
FIG. 1 is a section view of a differential gear mechanism.
Figure 2:
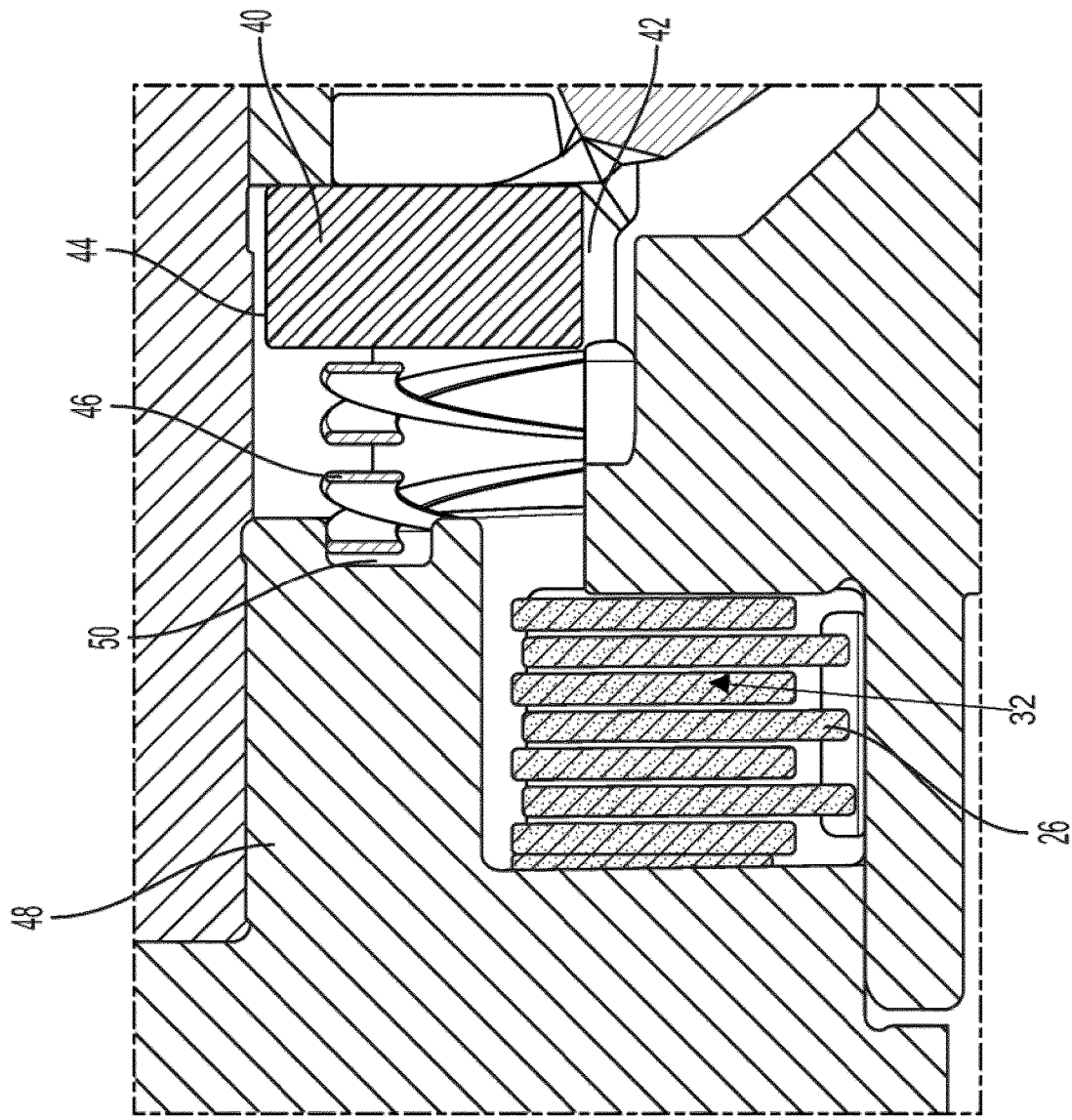
FIG. 2 is an enlarged view taken from FIG. 1.

Referring to FIG. 1, the differential gear mechanism 10 includes a first or right gear case 12 and a second or left gear case 14, which defines gear chamber 16. Torque input to the differential is typically provided by a ring gear (not shown), which may be attached to a flange 18 of the right gear case 12 or the left gear case 14.

Disposed within the gear chamber 16 is a differential gear set including a pair of input pinion gears 18, which are rotatably mounted on a pinion shaft 20. The pinion gears 18 are in meshing engagement with a pair of side gears 22 and 24.

As is well known to those skilled in the art, during normal straight-ahead operation of the vehicle, no differentiation occurs between the left and right side gears 22 and 24, and therefore, the pinion gears 18 do not rotate relative to the pinion shaft 20. The gear case halves 12, 14, the pinion gears 18, and the side gears 22 and 24 all act as a unit. When the vehicle is turning differentiating action may occur between the side gears 22 and 24.

A pair of clutch packs or first and second clutch packs 26 are positioned in pockets 28 between the case halves 12, 14, and the opposing side gears 22, 24. The clutch 26 packs include a plurality of clutch disks 30, which are in splined engagement with the gear cases 12 and 14. The clutch 26 packs also include a plurality of clutch disks 32, which are in splined engagement with the side gears 22, 24. The clutch packs 26 provide a limited slip differential capability or define a limited slip.

The clutch packs include a preload spring which applies some pressure on the clutch pack 26 and more pressure is applied when the engine power/torque is applied to the side gears 22, 24 through the pinion gears 18. When torque is applied to pinion gears 18, this creates an axial force, which tries to force the pinion gears 18 apart. This in turn puts pressure on the side gears 22, 24 forcing it outward toward the differential case halves 12, 14. This outward force compresses the clutch disks 30, 32 together causing them to lock.

When the vehicle is moving straight ahead, the differential acts like a standard differential, as the clutch packs 26 are not engaged. When turning or when one wheel has low traction, the wheel with the most traction has higher turning resistance than the wheel, which is slipping. The engine torque applied through the pinion gear 18 to the side gear 22, 24 with higher traction causes more separating force between the pinion gear 18 and side gear 22, 24. This forces the side gear 22, 24 toward the differential case halve 12, 14 engaging the clutch pack 26. The side gear 22, 24 of the slipping wheel has little turning resistance to the torque. It does not have the same force on the side gear toward the differential case halves 12, 14 and thus does not compress the clutch disks 30, 32.

The differential gear mechanism 10 includes a direct acting electronic locking capability. An electric actuator mechanism 34 includes at least one actuating rod 36 coupled to an electric stator 38. Various numbers of stators 38 and actuating rods may be utilized. The at least one actuating rod 36 in the depicted embodiment passes through the right case halve 12 in a bore and is coupled to a locking collar 40. The locking collar 40 includes teeth 42 formed on an inner diameter of the locking collar, 40 which selectively engage with the outer diameter of the side gear 24 to lock the differential. The locking collar 40 is disposed within a cavity 44 defined by the gear case halves 12, 14 and the side gear 24. The locking collar 40 is biased to a disengaged position by a biasing spring 46. In the depicted embodiment the biasing spring 46 biases the locking collar toward the right gear case.

In the depicted embodiment, the left case half 14 includes a laterally extending wall 48 formed thereon. The laterally extending wall 48 separates the clutch pack 26 from the locking collar 40. The laterally extending wall 48 includes a notch 50 formed thereon that receives one end of the spring 46 with the opposing end contacting the locking collar 40.

In use, the differential gear mechanism 10 includes clutch packs 26 on both side gears 22, 24 to provide a limited slip functionality as described above. The electric actuator mechanism 34 is normally biased to a disengaged position by the spring 46, which moves the locking collar 40 away from engagement with the side gear 24. Upon activation of the stator 38, the locking collar 40 is moved by the actuating rod 36 to engage with the side gear 24 to lock the differential gear mechanism 10. The actuation may be in response to a control signal from a control module or may be actuated in response to activation of a switch by a user. After the stator is de-energized, the differential gear mechanism 10 is returned to a disengaged position by the spring 46. The above described differential gear mechanism 10 provides a collar type direct acting differential which combines limited slip and locking capability.

The invention claimed is:

1. A differential assembly comprising:
    a first case half;
    a second case half connected to the first case half, the first and second case halves defining a gear chamber, the first and second case halves each including pockets formed therein;
    a differential gear set disposed in the gear chamber;
    a first clutch pack and a second clutch packs disposed in the pockets between the first and second case halves and differential gear set, the first and second clutch packs engaging the first and second case halves and the differential gear set defining a limited slip;
    a locking collar disposed in a cavity formed in one of the first or second case halves; and,
    an electric actuator mechanism coupled to the locking collar selectively moving the locking collar into engagement with the differential gear set locking the differential;
    wherein the locking collar includes teeth formed on an inner diameter of the locking collar.

2. The differential assembly of claim 1, wherein the electric actuator mechanism includes at least one actuating rod coupled to an electric stator on one end and coupled to the locking collar on an opposing end.

3. The differential assembly of claim 2, wherein the one of the first or second gear case halves includes a bore formed therein, the at least one actuating rod disposed therein, wherein the electric stator is positioned on one of the gear case halves and the locking collar is positioned in the other gear case halve.

4. The differential assembly of claim 1, wherein one of the first or second case halves includes a laterally extending wall formed thereon, the laterally extending wall separating the first clutch pack from the locking collar.

5. The differential assembly of claim 4, wherein the laterally extending wall includes a notch formed therein.

6. The differential assembly of claim 5, further including a biasing spring having one end disposed in the notch and an opposing end contacting the locking collar biasing the locking collar to an unlocked position.

7. The differential assembly of claim 1, wherein the differential gear set includes a pair of input pinion gears rotatably mounted on a pinion shaft, the pinion gears in meshing engagement with a pair of side gears.

8. The differential assembly of claim 1, wherein the teeth engage an outer diameter of a side gear when in a locked position.

9. The differential assembly of claim 1, wherein the first and second clutch packs each include a plurality of clutch disks in splined engagement with the first and second case halves.

10. The differential assembly of claim 9, wherein the first and second clutch packs each include a plurality of clutch disks in splined engagement with side gears.

11. A differential assembly comprising:
    a first case half;
    a second case half connected to the first case half, the first and second case halves defining a gear chamber, the first and second case halves each including pockets formed therein;
    a differential gear set disposed in the gear chamber;
    a first clutch pack and a second clutch packs disposed in the pockets between the first and second case halves and differential gear set, the first and second clutch packs engaging the first and second case halves and the differential gear set defining a limited slip;
    a locking collar disposed in a cavity formed in one of the first or second case halves; and,
    an electric actuator mechanism coupled to the locking collar selectively moving the locking collar into engagement with the differential gear set locking the differential, wherein one of the first or second case halves includes a laterally extending wall formed thereon, the laterally extending wall separating the first clutch pack from the locking collar, wherein the laterally extending wall includes a notch formed therein and including a biasing spring having one end disposed in the notch and an opposing end contacting the locking collar biasing the locking collar to an unlocked position.

12. The differential assembly of claim 11, wherein the first and second clutch packs each include a plurality of clutch disks in splined engagement with the first and second case halves and wherein the first and second clutch packs each include a plurality of clutch disks in splined engagement with side gears.

13. The differential assembly of claim 11, wherein the locking collar includes teeth formed on an inner diameter of the locking collar wherein the teeth engage an outer diameter of a side gear when in a locked position.

14. A differential assembly comprising:
    a first case half;
    a second case half connected to the first case half, the first and second case halves defining a gear chamber, the first and second case halves each including pockets formed therein;
    a differential gear set disposed in the gear chamber, the differential gear assembly comprising a side gear with an outer diameter;
    a first clutch pack and a second clutch pack disposed in the pockets between the first and second case halves and the differential gear set, the first and second clutch packs engaging the first and second case halves and the differential gear set defining a limited slip;
    a locking collar disposed in a cavity formed in one of the first or second case halves;
    an electric actuator mechanism coupled to the locking collar selectively moving the locking collar into engagement with the differential gear set locking the differential; and
    wherein the locking collar selectively engages with the outer diameter of the side gear to lock the differential.

* * * * *